US008655750B2

(12) United States Patent
Kaiser

(10) Patent No.: US 8,655,750 B2
(45) Date of Patent: Feb. 18, 2014

(54) IDENTIFYING THE MOST RELEVANT COMPUTER SYSTEM STATE INFORMATION

(75) Inventor: Matthias Kaiser, Mountain View, CA (US)

(73) Assignee: SAP AG, Walldorf (DE)

( * ) Notice: Subject to any disclaimer, the term of this patent is extended or adjusted under 35 U.S.C. 154(b) by 147 days.

(21) Appl. No.: 12/904,884

(22) Filed: Oct. 14, 2010

(65) Prior Publication Data

US 2011/0029912 A1 Feb. 3, 2011

Related U.S. Application Data

(63) Continuation of application No. 11/269,780, filed on Nov. 7, 2005, now Pat. No. 7,840,451.

(51) Int. Cl.
*G06Q 10/00* (2012.01)

(52) U.S. Cl.
USPC ............................... 705/28; 705/7.11; 705/22

(58) Field of Classification Search
USPC ............................................ 705/28, 7.11, 22
See application file for complete search history.

(56) References Cited

U.S. PATENT DOCUMENTS 4,736,296 A 4/1988 Katayama et al.
4,914,590 A 4/1990 Loatman et al.
4,930,071 A 5/1990 Tou et al.
4,931,935 A 6/1990 Ohira et al.
4,974,191 A 11/1990 Amirghodsi et al.
4,994,967 A 2/1991 Asakawa
5,167,010 A * 11/1992 Elm et al. ........................ 706/45
5,193,143 A 3/1993 Kaemmerer et al.
5,239,617 A 8/1993 Gardner et al.
5,255,386 A 10/1993 Prager
5,282,265 A 1/1994 Rohra Suda et al.
5,369,575 A 11/1994 Lamberti et al.

(Continued)

FOREIGN PATENT DOCUMENTS

EP 0052757 6/1992
EP 0 692 765 1/1996
GB 2 153 560 8/1985

OTHER PUBLICATIONS

Chadha, Vineet, "Book Review: Rob's Guide to Using VMware, by Rob Bastiaansen,"[online] [retrieved on Aug. 22, 2005] <URL: http://www.virtual-strategy.com/article/articleview/5381/2/>, pp. 1-3.

(Continued)

*Primary Examiner* — Ramsey Refai
(74) *Attorney, Agent, or Firm* — Fish & Richardson P.C.

(57) ABSTRACT

Operations to manage statements relating to a computer system state include obtaining, in a computer system and from any of several sources, statements that relate to a current state of the computer system. Each statement comprises several elements. The operations comprise assigning focus values to the elements of each statement, each focus value indicating a relevance of the element to the current state of the computer system. The operations comprise identifying a subset of the statements based on the focus values. The operations comprise making a first output to a user, the first output being selected from several predefined outputs using the subset of the statements. The output may represent the current state to the user or it may present at least one of several predefined goals to the user for selection, the at least one goal being identified as being possible to accomplish based on the current state.

18 Claims, 5 Drawing Sheets

(56) References Cited

U.S. PATENT DOCUMENTS

| | | | | |
|---|---|---|---|---|
| 5,577,165 | A | 11/1996 | Takebayashi et al. | |
| 5,615,342 | A | 3/1997 | Johnson | |
| 5,748,158 | A | 5/1998 | Kim | |
| 5,794,050 | A | 8/1998 | Dahlgren et al. | |
| 5,802,504 | A | 9/1998 | Suda et al. | |
| 5,819,225 | A | 10/1998 | Eastwood et al. | |
| 5,953,526 | A | 9/1999 | Day et al. | |
| 6,021,403 | A | 2/2000 | Horvitz et al. | |
| 6,050,898 | A | 4/2000 | Vange et al. | |
| 6,101,485 | A | 8/2000 | Fortenberry et al. | |
| 6,157,310 | A | 12/2000 | Milne et al. | |
| 6,286,131 | B1 | 9/2001 | Beers et al. | |
| 6,557,035 | B1 | 4/2003 | McKnight | |
| 6,675,159 | B1 | 1/2004 | Lin et al. | |
| 6,738,764 | B2 * | 5/2004 | Mao et al. | 1/1 |
| 6,824,049 | B2 | 11/2004 | Lee et al. | |
| 6,950,793 | B2 | 9/2005 | Ross et al. | |
| 7,010,588 | B2 | 3/2006 | Martin et al. | |
| 7,024,348 | B1 | 4/2006 | Scholz et al. | |
| 7,027,974 | B1 | 4/2006 | Busch et al. | |
| 7,158,628 | B2 | 1/2007 | McConnell et al. | |
| 7,225,183 | B2 | 5/2007 | Gardner | |
| 7,328,209 | B2 | 2/2008 | Das et al. | |
| 7,475,133 | B2 * | 1/2009 | Nuggehalli | 709/224 |
| 2004/0010711 | A1 | 1/2004 | Tang et al. | |
| 2004/0034652 | A1 * | 2/2004 | Hofmann et al. | 707/102 |
| 2004/0102960 | A1 | 5/2004 | Shimomura et al. | |
| 2004/0181390 | A1 | 9/2004 | Manson | |
| 2005/0054381 | A1 | 3/2005 | Lee et al. | |
| 2005/0080628 | A1 | 4/2005 | Kuperstein et al. | |
| 2005/0097121 | A1 * | 5/2005 | Sally et al. | 707/102 |

OTHER PUBLICATIONS

Kerkez et al., "Incremental Case-Based Plan Recognition Using State Indices," [online]. [Retrieved on Aug. 22, 2005] Retrieved from the Internet: <URL: http://www.cs.wright.edu/~mcox/Papers/kerkez-cox-iccbr01.pdf> pp. 1-15.

Kieras, David "A Guide to GOMS Task Analysis," [online] 1994. Retrieved from the Internet <URL: http://www-static.cc.gatech.edu/computing/classes/cs6751_98_fall/handouts/GOMS-Kieras.hlml> pp. 1-47.

McCarthy, John, "Actions and Other Events in Situation Calculus," [online]. Computer Science Department Stanford University Stanford, Feb. 8, 2002. Retrieved from the Internet URL <http://www-formal.stanford.edu/jmc/sitcalc/sitcalc.html> pp. 1-13.

McCarthy et al., "Some Philosophical Problems From the Standpoint of Artificial Intelligence," [online] Computer Science Dept Stanford University, 1969. Retrieved from the Internet URL <http://www-formal.stanford.edu/jmc/mcchay69/mcchay69.html>. pp. 1-51.

Newell et al., "Human Problem Solving," Prentice-Hall, Inc., 1972, pp. 87-140.

Polya G., "How to Solve it: A New Aspect of Mathematical Method," Doubleday & Company, Inc., 2nd Ed., 1957, pp. v-xvii.

Watson et al., Case-Based Reasoning: A Review,' [online] The Knowledge Engineering Review, 1994 [retrieved on Aug. 22, 2005] <URL: http://www.ai-cbr.org/classroom/cbr-review.html >, pp. 1-33.

Amazon.com Frequently Asked Questions [online], SourceForge.net, 2005 [retrieved on Aug. 18, 2005]. <URL: http://www.amazon.com/exec/obidos/tg/browse/-/13316081/ref=pd_ys_help_iyr/103-5110429-2895835 >, pp. 1-6.

Kubrick and Clarke, screenplay of 2001: *A Space Odyssey. Knowledge in Speech and Language Processing*, [online] Retrieved from the Internet: <URL: http://www.cs.colorado.edu/~martin/SLP/slp-ch1.pdf> pp. 1-18.

Fuchs et al., *Controlled Natural Language Can Replace First-Order Logic* [online] Retrieved on Jul. 20, 2005. Retrieved from the Internet: <URL: http://www.ifi.unizh.ch/groups/req/ftp/papers/ASE99.pdf>.

Sowa, John F. "Controlled English" [online] John F. Sowa 1999, 2004, [retrieved on Jul. 20, 2005]. Retrieved from the Internet: <URL: http://www.jfsowa.com/logic/ace.htm>.

Schwitter and Fuchs, *Attempto From Specifications in Controlled Natural Language Towards Executable Specifications*. Presented at EMISA Workshop "Natürlichsprachlicher Entwurf von Informationssystemen—Grundlagen, Methoden, Werkzeuge, Anwendungen" May 28-30, 1996. Ev. Akademie Tutzing (pp. 1-15).

"Know the Rules!" [online] European Business Rules Conference 2005, [retrieved on Jul. 20, 2005]. Retrieved from the Internet: <URL: http://www.eurobizrules.org/speakers/hoppen.htm>.

Prager et al, "Reason: An Intelligent User Assistant for Interactive Environments," IBM Systems Journal, IBM Corp., Armonk, New York, Jan. 1990, 29(1): 141-164.

Jurafsky & Martin, 2000, *Speech and Language Processing: An Introduction to Natural Language Processing, Computational Linguistics, and Speech Recognition*, Chapter 1, pp. 1-18, Prentice Hall.

Ian Sommerville, "Software Engineering," Seventh Edition, Chapter 4: Software processes and Chapter 6: Software requirements, Pearson Education, 2004, pp. 74-79 and 118-119.

Smith et al, "Intelligent Help—The Results of the EUROHELP Project," ICL Technical Journal, Oxford, GB, 7(2): 328-361, Nov. 1990.

USPTO Final Office Action in U.S. Appl. No. 11/269,784, mailed Apr. 23, 2009, 21 pages.

USPTO Non Final Office Action in U.S. Appl. No. 11/269,784, mailed Oct. 29, 2008, 19 pages.

USPTO Non Final Office Action in U.S. Appl. No. 11/269,784, mailed May 22, 2008, 17 pages.

USPTO Non Final Office Action in U.S. Appl. No. 11/294,992, mailed Sep. 15, 2008, 9 pages.

USPTO Non Final Office Action in U.S. Appl. No. 11/294,992, mailed Dec. 31, 2007, 13 pages.

USPTO Final Office Action in U.S. Appl. No. 11/294,992, mailed Jun. 23, 2008, 10 pages.

EPO Non Final Office Action in App. No. 06 021 742.9, mailed Mar. 6, 2008, 11 pages.

Extended European Search Report for Application No. 06 024 314.4 , dated Apr. 10, 2007, 7 pages.

Extended European Search Report for Application No. 06 021 908.6, dated Feb. 20, 2007, 4 pages.

Extended European Search Report for Application No. 06021742.9, dated Jun. 22, 2007, 3 pages.

Abraham Silberschatz, et al., "*Operating System Concepts*," Chapter 4: Processes and Chapter 5: CPU Scheduling, 1994, pp. 97-148.

* cited by examiner

IDENTIFYING THE MOST RELEVANT COMPUTER SYSTEM STATE INFORMATION

CROSS-REFERENCE TO RELATED APPLICATIONS

This application is a continuation of U.S. application Ser. No. 11/269,780, filed on Nov. 7, 2005, the disclosure of which is expressly incorporated herein by reference in its entirety.

TECHNICAL FIELD

The description relates to managing, in a computer system, statements that relate to a state of the system.

BACKGROUND

There is almost always a need for the human user(s) of a computer system to be informed of the current state of the computer system. This is typically done by making some forms of output in the user interface, for example by visual display, audible feedback, or printed hardcopies, to name some examples. However, the state of even a relatively simple computer system may have many different aspects or nuances that could potentially be output to represent the current state. To make such an all-encompassing output would require a substantial amount of system resources and would probably not be very helpful to the user, because it would include much information that the user is presently not interested in. That is, only some portion(s) of the overall current state may be relevant to the user in the present situation. There is thus a need to tailor the output that is made to the user so that it focuses on the more relevant aspects of the current state.

SUMMARY

The invention relates to managing statements relating to a state of a computer system.

In a first general aspect, the invention comprises a computer-program product tangibly embodied in an information carrier, the computer-program product comprising instructions that when executed cause a processor to perform operations to manage statements relating to a computer system state. The operations comprise obtaining, in a computer system and from any of several sources, statements that relate to a current state of the computer system. Each statement comprises several elements. The operations comprise assigning focus values to the elements of each statement, each focus value indicating a relevance of the element to the current state of the computer system. The operations comprise identifying a subset of the statements based on the focus values. The operations comprise making a first output to a user, the first output being selected from several predefined outputs using the subset of the statements.

In selected embodiments, the focus values correspond to which of the elements occur most frequently in the statements. Each focus value may indicate total occurrences of the corresponding element in the statements. The focus values may be assigned using a relevancy algorithm. The elements may be of types including concepts, properties associated with the concepts, and relationships existing between the concepts, and the relevancy algorithm may attribute different weights to the types of elements. At least one of the several sources may comprise an application program and a first statement of the obtained statements may correspond to a state of the application program. At least one of the several sources may comprise an input device and a first statement of the obtained statements may correspond to user input. At least one of the several sources may comprise a data repository and a first statement of the obtained statements may correspond to stored information retrieved from the data repository. The first output may comprise a representation of the current state of the computer system to the user. The elements may be of types including concepts, properties associated with the concepts, and relationships existing between the concepts. Assigning the focus values may further comprise determining whether at least one of the concepts is more relevant than an attribute associated therewith. The focus values may be assigned based on determining which of the concepts, properties and relationships occur most frequently in the statements. The types of elements may be defined in a model, and assigning the focus values may further comprise determining, from the model, whether two or more elements have a common type. The statements may comprise logical propositions that have been determined to be true in the current state of the computer system. The operations may further comprise analyzing the subset to identify, among several predefined goals, at least one goal as being possible to accomplish based on the current state, and the first output may present the at least one goal to the user for selection.

In a second general aspect, the invention comprises a computer-program product tangibly embodied in an information carrier, the computer-program product comprising instructions that when executed cause a processor to perform operations to represent a computer system state to a user. The operations comprise obtaining, from a model that is maintained in a computer system and updated at times, statements that relate to a current state of the computer system. Each statement includes at least one element, wherein the model uses the statements to associate each of several predefined goals with at least one of several predefined actions that can be performed in the computer system to accomplish the associated predefined goal. The operations comprise determining a subset of the statements that is most relevant to the current state of the computer system. The subset is determined by analyzing which of the elements occur most frequently in the statements. The operations comprise making an output to a user that includes the subset of the statements. The output indicates to the user that the subset represents the current state of the computer system.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1:
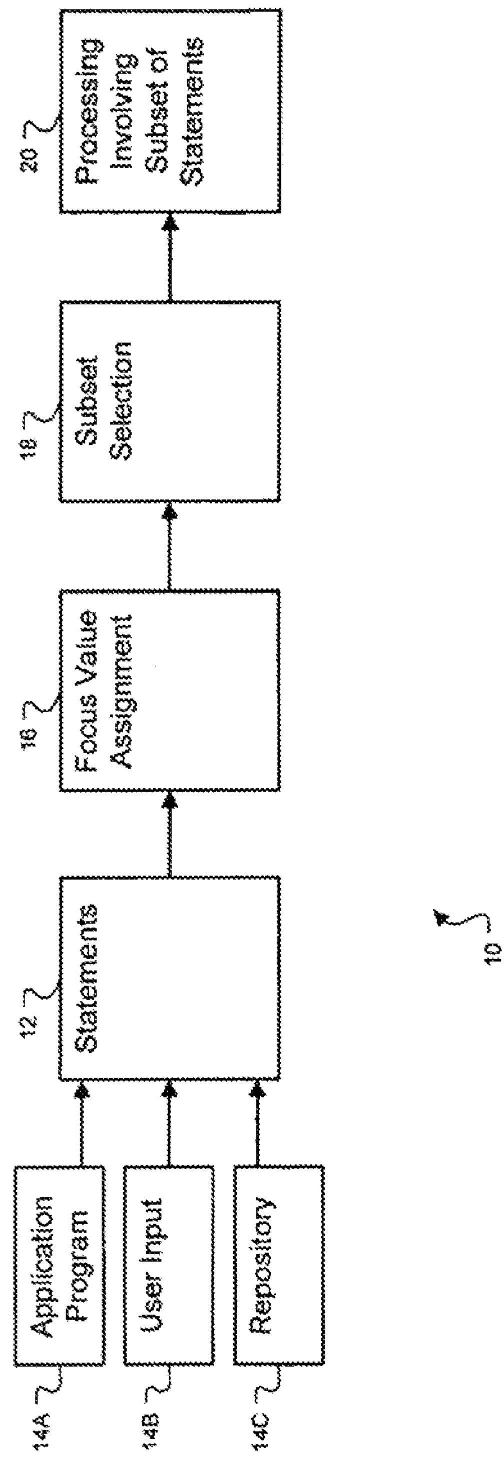
FIG. 1 is a block diagram of a computer system that manages statements relating to a current state of the computer system.

FIG. 1 shows a block diagram conceptually representing a process 10 that can be performed in a computer system to manage statements 12 relating to a current state of the computer system. In general, there may be many statements available that relate to the current state of the computer system. The process 10 may retrieve the statements 12 from several sources, such as a state of an application program 14A, a user input 14B that affects the system state, and stored information from a data repository 14C. However, a user may only be interested in receiving and reviewing statements that are most relevant to the current state of the computer system. In other words, the information output to the user should focus on those aspects of the system state that are most relevant to the user. To this end, the process 10 rates the statements 12 according to their relevance, referred to here as the assignment of one or more focus values.

Each of the statements 12 undergoes a focus value assignment 16 in the process 10. The statements 12 comprise several elements that can be expressed in a notation susceptible to logical processing, for example a first-order predicate calculus. The focus values are individually assigned to the elements to indicate their relevance to the current system state.

The statements 12 also undergo a subset selection 18 where the process 10 chooses a subset of statements based on the focus values of the statements 12. Particularly, those statements that are the most relevant to the current state, based on their focus values, may be selected. The subset of statements is used to select from several predefined outputs, and the selected outputs are presented to the user. In some implementations, the output includes a representation of the current state of the computer system. Processing involving the subset of statements 20 may occur. For example, the predefined output may include suggestions for several goals that may be accomplished in the current state of the computer system, such as by performing one or more predefined actions in the application program 14A.

Figure 2A:
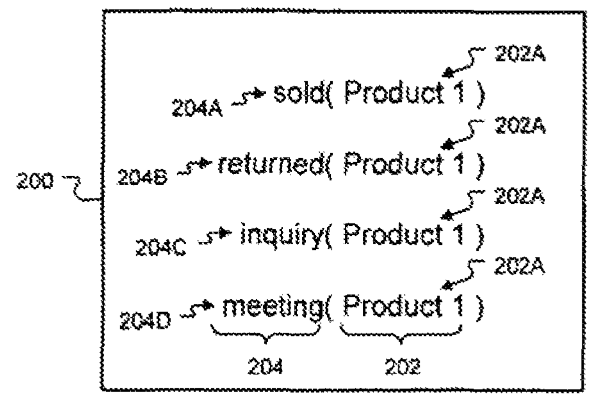
FIG. 2A is a first example of a model, of the current state of the computer system, comprising logical propositions that have been determined to be true.

FIG. 2A shows an example of a collection of statements that relate to a state that a computer system has in a first situation. Here, the computer system is an inventory and sales tracking system operated by a manufacturer. The computer system obtains a collection 200 of statements from one or more of the available sources. The statements contain several elements and may comprise logical propositions that have been determined to be true in the current state of the computer system. The collection 200 includes only four statements in this example for brevity, and may contain many more statements in other situations.

The statements in the collection 200 of FIG. 2A contain one or more concepts 202 that represent entities such as actors or items, and properties 204 of the concepts 202. For example, a "Product 1" concept 202A has a property of "sold" 204A, representing a past transaction in which a specific Product 1 was sold. Product 1 also occurs in three other statements that relate to the current state of the computer system. In the second statement, Product 1 has a property of "returned" 204B, representing a past event in which a customer returned a specific Product 1. Product 1 also has, in the third statement, a property of "inquiry" 204C, representing an event where the manufacturer's customer call center received an inquiry about Product 1. Finally, in the fourth statement, Product 1 has a property of "meeting" 204D, representing that the user of the computer system is scheduled for a meeting about Product 1, perhaps to discuss its sales, returns, or customer inquiries. Thus, instances of Product 1 have been sold, returned and inquired about, and Product 1 is also the subject of a meeting. Product 1 therefore appears to be very relevant to the current state of the computer system based on the frequency with which it occurs in the statements in the collection 200. In contrast, each of the property elements sold 204A, returned 204B, inquiry 204C, and meeting 204D occur less frequently than Product 1. They may therefore be considered less relevant to the current state of the computer system. That is, when evaluated in light of the whole collection 200 of statements, there is a relatively high occurrence of Product 1 events and a relatively low occurrence of sold events. Similarly, the occurrence of the return, inquiry, and meeting events is relatively low.

The computer system assigns a focus value to each element indicating the relevance of the element. For example, the system may store the focus value as a temporary variable associated with the respective element to which it belongs. In some implementations, the computer system assigns the focus values to the elements based on the frequency that each element occurs in the collection 200. A focus value of an element may indicate the number of times that the element occurs in the collection 200.

Here, the system may assign a focus value "4" to each of the elements corresponding to the Product 1, representing the four occurrences of that concept in the collection 200. Each of the sold, returned, inquiry and meeting elements, in contrast, may be assigned a focus value "1". As another example, the Product 1 element may be assigned a "high" focus value, or a designated symbol, representing its high prevalence, while the property elements may be assigned "low" focus values. Other approaches for assigning a computer-readable value to an element that represents its relevance may be used.

Figure 2B:
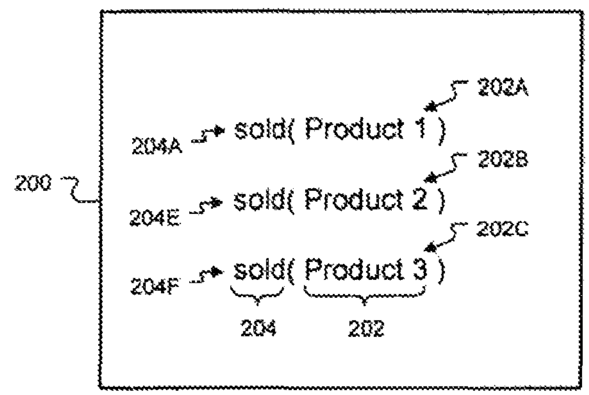
FIG. 2B is a second example of the model.

FIG. 2B shows the collection 200 in a second situation, representing a second state of the computer system. That is, at another time the computer system collects the statements that are then available to it from any or all of the sources, and places them in the collection 200, where the previous statements are no longer present. The process of collecting the statements may be performed regularly or upon a predefined event, such as when there is an instruction to make an output relating to the current system state.

Again, the collection 200 includes several statements having concepts 202 and properties 204 associated with the concepts 202. Here, "Product 1" 202A has a property of "sold" 204A, as it did in the previous example. "Product 2" 202B has a property of "sold" 204E, and "Product 3" 202C has a property of "sold" 204F. The "sold" properties indicate past events when Product 2 and Product 3, respectively, were sold. Based on analyzing this collection, it can be determined that Product 1 is not currently the most relevant element in the collection 200. Rather, the property of some product being sold occurs more frequently than each individual event involving any of the Product 1, Product 2, and Product 3 concepts. Accordingly, the system may assign the focus value "3" or equivalent to the "sold" element to indicate the relative frequency of statements relating to product sales. Similarly, the product concepts may be assigned respective "1" focus values.

Focus values may be assigned based on factors other than frequency of occurrence. The semantics of an element may be taken into account in the focus value assignment 16. For example, this step may involve matching the elements against a preexisting list of terms or expressions whose semantics suggest a drastic or severe change in the state of the computer system. For example, the terms emergency, urgent or failure imply greater saliency than the terms constant, regular or ordinary. This analysis may be regarded as concerning the "ontological impact" of the respective element or statement.

Figure 3:
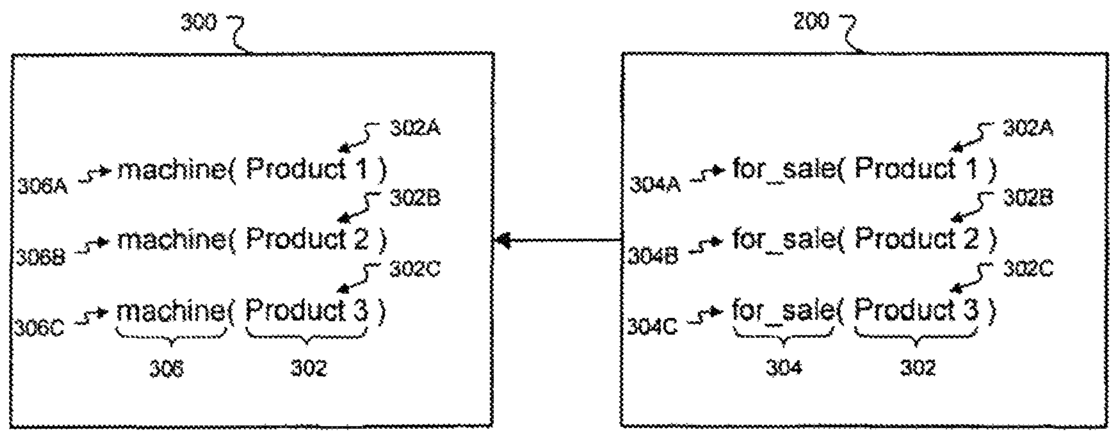
FIG. 3 is a third example of the model.

In some implementations, concepts and their properties are defined and maintained in a model which also allows relationships to be defined between two or more of the concepts. Such a model may be accessed at the focus value assignment stage. FIG. 3 shows the collection 200 in a third situation, representing a third state of the computer system. Here, the collection 200 contains a first set of statements having concepts 302 and properties 304 associated with the concepts 302. "Product 1" 302A has a property of "for_sale" 304A, "Product 2" 302B has a property of "for_sale" 304B, and "Product 3" 302C has a property of "for_sale" 304C. Every concept in the first set of statements has the property for_sale and this property is therefore highly relevant. Each of the individual concepts Product 1, Product 2, and Product 3 occur less frequently than the for_sale property and is less relevant. However, if the different products all have some feature in common, its occurrence may be frequent enough that it should be given a high focus value. For this reason, the focus-value assignment 16 (see FIG. 1) may involve consulting a model for the involved concepts and properties.

As shown in FIG. 3, a model 300 defines the concepts 302 and properties 306 associated with the concepts 302. Here, Product 1 has a property of being a "machine" 306A, Product 2 has a property of being a "machine" 306B, and Product 3 has a property of being a "machine" 306C. Thus, upon analyzing also the model 300 it can be determined that the property "machine" appears to be more relevant that any of the individual concepts Product 1, Product 2, or Product 3. Since the machine property is a static property of these items the computer system may weight its focus value less than dynamic properties, such as the for_sale property. In some implementations, the computer system determines the focus values of the elements using a relevancy algorithm that incorporates the above-described and other approaches for determining relevance.

The for_sale property may be output to the user in a presentation of the current state of the computer system, such as in the output statement, "Many items remain for sale." In some implementations, the computer system determines from the model 300 that the items for sale, Product 1, Product 2, and Product 3 all have a common type, the machine property. An output in this case may include a statement, such as, "Many machine items remain for sale."

The statements in the above examples expressed the associations between properties and concepts using a formal style, not using sentences of ordinary English. However, in other implementations natural-language statements may be evaluated to assign focus values to elements thereof. In such examples, the relevance of the evaluated statement may be impacted not only by the explicit mentioning of a specific concept, property or association, but also any more indirect references thereto or implications thereof. Particularly, the focus value assignment 16 may be configured to also detect pronouns relating to a particular element.

Figure 4:
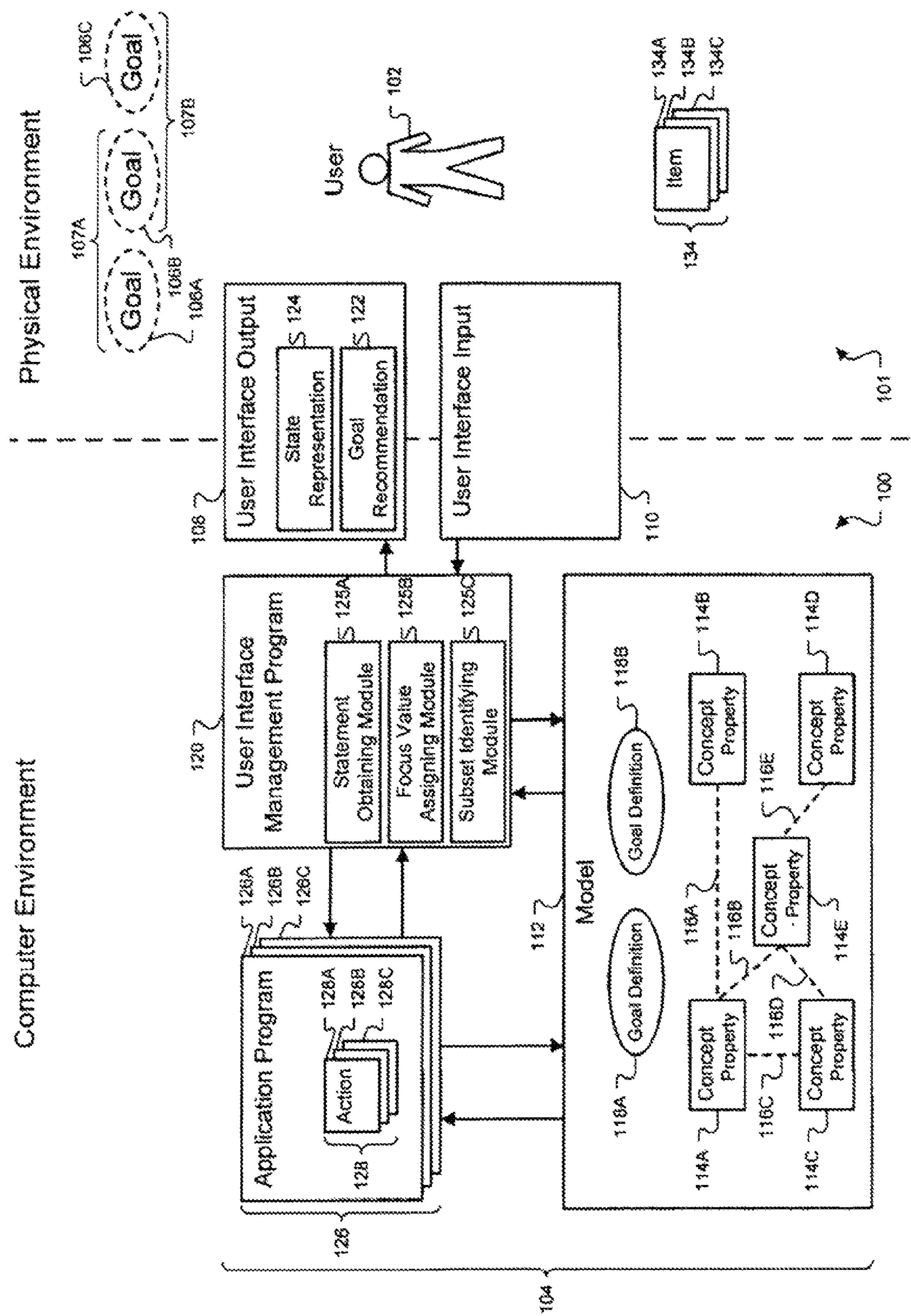
FIG. 4 is a block diagram of a computer system that makes an output, selected using a subset of statements relating to a current state of the computer system, to a user.

In some implementations, focus values are assigned to statements for use in selecting the statements that are most relevant for making a goal recommendation. FIG. 4 shows a block diagram of a computer environment 100 that can interact with a physical environment 101 in certain ways. Particularly, one or more goals that are deemed capable of being accomplished can be recommended to a user. The system selects the goal(s) for recommendation based on analyzing a subset of statements, the subset being identified based on the focus values. Upon the user selecting a goal, the system can perform one or more predefined actions that are associated with accomplishing the selected goal. As another example, the system can output the selected subset to inform the user what is the current system state.

Operations may be performed in the computer environment 100 that support a user 102 in the physical environment 101 in using, or otherwise interacting with, a computer system 104 in the computer environment 100. Particularly, the computer system 104 can present to the user 102 an output selected using of subset of statements most relevant to the current state of the computer system 104. The computer system 104 can recommend to the user 102 one or more goals that have been identified as possible to accomplish, the accomplishment being associated with performing one or more actions in the computer system 104.

The user 102 in the physical environment 101, and in a particular real-world situation, may have one or more goals 106A, 106B, and 106C which can be accomplished using the computer environment 100. Each goal 106A, 106B, and 106C relates to one or more domains 107A or 107B in which the user is knowledgeable. The domains 107A-B include any areas where a person can develop and maintain knowledge, such as financial transactions, business dealings, electronic exchange of information, to name a few examples. The goals 106A-C, in turn, are specific results that can be accomplished in the respective domain(s) 107A-B. For example, goals may consist of validating, authenticating, authorizing, confirming or verifying some item or entity that exists in the physical environment 101. Goals may also consist of combinations of these or other concepts. In short, the goals 106A-C are understandable to the user 102 as intangible concepts in a real-world situation, as indicated by their dashed outlines.

In supporting the user interaction, the computer system 104 may provide one or more user interface outputs 108 for presenting the current state of the system 104 and recommending one or more of the goals 106A, 106B, and 106C to the user. The system 104 may receive one or more user interface inputs 110 upon the user 102 selecting between the presented goals. In some implementations, a computer program product capable of performing these and other functions is implemented to provide a user interface in the computer system 104.

The computer system 104 includes a model that it updates from time to time. The model reflects the current state of the computer system 104 using statements having elements within them. The current state of the system 104 may be represented by elements, such as concepts, properties associated with the concepts, and any relationships between the concepts. Particularly, the computer system 104 may maintain a model 112 including concepts 114A-E, each having one or more properties associated therewith, and relationships 116A-E, where the model 112 reflects the current state of the system 104. For example, the model 112 indicates that the concept 114A currently has the relationship 116A with the concept 114B. In addition, the model 112 includes two or more predefined goal definitions 118A-B. The model may be a computer-readable structure for holding information in a representative capacity, the information including several concepts, where each concept can have at least one property assigned to it and can have relationships defined with any or all other concepts in the model. Each concept may be a computer-readable structure for holding information regarding an idea, notion or entity, such as an item or an actor. Each property may be a characteristic that can be assigned to a concept.

From time to time, there may be executed an instruction in the computer system 104 to evaluate the current state and recommend one or more goals to the user. The computer system 104 may then analyze the current state using the model 112 and indicate a goal subset as being possible to accomplish in the real-world situation of the user 102. The subset may include all, some or a single one of the goal definitions 118A-B. The goal definitions are predefined and can be updated, added or replaced as needed. Each of them corresponds to one of the goals 106A-C that exist in the domain(s) 107A-B in which the user is knowledgeable.

A user interface management program (UIMP) 120 may be responsible for the processing in the computer system 104 that relates to the model 112, and in particular may output the subset of the goals 118A-B and the current state of the system 104 to the user 102, as schematically illustrated by a goal recommendation 122 and a state representation 124, respectively. The goal recommendation 122 and the state representation 124 may be output in a format such as an audible message or a message presented on a display device.

The purpose of the state representation 124 is to present to the user 102 the most relevant statement(s) regarding the current state of the system 104. The UIMP 120 contains three modules involved in this task, a statement obtaining module 125A, a focus assigning module 125B, and a subset identifying module 125C.

The statement obtaining module 125A obtains the statements relating to the current state of system 104. The statements may come from several sources, such as application programs 126, a repository, or the user interface input 110. For example, the application program 126A may provide a statement indicating its current state.

The focus assigning module 125B assigns focus values to the elements of the statements. The focus value of an element may be based on the frequency with which it occurs and may indicate the number of times that it occurs in the model 112. As another example, the focus value may be assigned based on a semantic of the element. The focus values may also be based on an algorithm, such as by attributing different weights to different types of elements. The focus values do not necessarily indicate that an element or the statement that contains it is per se relevant. Rather, the focus value indicates that the element (or the statement) is salient to the present state of the computer system.

The subset identifying module 125C identifies the statements most relevant to the current state of the system 104. The subset identifying module 125C uses the focus values of the elements to identify the most relevant statements. The subset of statements is then used to select from several predefined outputs to be presented to the user 102.

The purpose of the goal recommendation 122 is to inform the user 102 what goal(s) the computer system 104 has identified, based on the current state, as being possible to accomplish. In some implementations, the goal recommendation 122 is triggered by the instruction to evaluate the current state and recommend to the user 102 the goals 118A-B that can currently be accomplished in the computer environment 100. The computer system 104 may identify the subset of the goals 118A-B by analyzing the current state, properties, and relationships of a group of concepts within the model 112 involved in the current state of the system 104.

The user 102 may make a goal selection in the user interface input 110 in response to the goal recommendation 122. The UIMP 120 receives the goal selection 124 and initiates the performance of one or more actions to accomplish the goal. The action(s) may be performed in any or all of the several application programs 126 that are included in the computer system 104. Each of the application programs 126A, 126B, and 126C may include respective actions 128 that are predefined instructions capable of being executed. The model 112 associates each of the goals 118A-B with one or of more of the actions 128 such that, upon the determination that, say, goal 118A can currently be accomplished, the statements in the model 112 can be accessed to determine which action(s) of the actions 128 should be performed for accomplishing the goal. For example, the UIMP 120 may cause the application program 126A to execute an action 128A that the model 112 associates with the goal 118A. In some implementations, an action may include a sequence of operations that the model 112 associates with accomplishing a goal. Actions, or several operations of an action, may be performed in more than one application program to accomplish a single goal. Additionally, performing an action may require information that is not currently stored in, or available to, the computer system 104. For example, the action(s) may include a request by the UIMP 120 for a situation information input from the user 102.

The computer system 104 updates the model 112 based on performing any of the actions 128. This may involve eliminating or revising any of the concepts 114, updating or adding properties to any or all of the concepts 114, or adding, modifying or removing any or all of the relationships 116, to name a few examples. For example, the concepts 114, properties and relationships 116 may initially be such that the system 104, upon analyzing them, determines that it is possible to accomplish the goal 118A but not the goal 118B. After performing the prescribed action(s), the concepts 114, properties and relationships 116 may have changed in a way so that it is no longer deemed possible to accomplish the goal 118A in the current state. In contrast, the current state of the model 112 may indicate that it is now possible to accomplish the goal 118B.

The UIMP 120 may make another user interface output 108 including an action explanation. The action explanation may explain, using information from the model 112, the performance of an action associated with a goal or goals selected by the user 102. The action explanation may be provided at the same time as the action(s) to accomplish the goal are performed, or after finishing the action(s), or by a combination of these approaches.

The concepts 114 in the model 112 may correspond to actors or items 134 involved in the current state of the system 104. For example, the concepts 114 may correspond to a product that the user 102 may sell.

Figure 5:
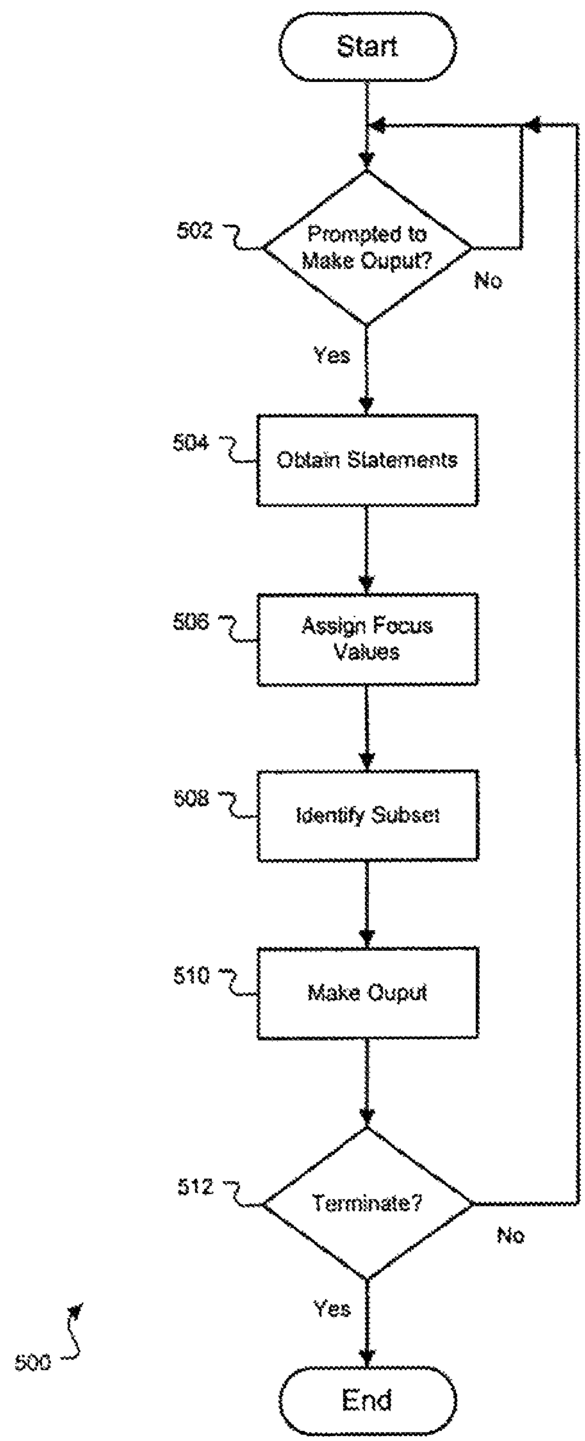
FIG. 5 is a flow chart of exemplary operations that a computer system may perform to manage statements relating to a current state of the computer system.

FIG. 5 is a flow chart of exemplary operations 500 that the computer system 104 can perform. A processor executing instructions stored in a computer program product can perform the operations 500. The operations 500 begin in step 502 with a decision to make an output, such as an output presenting the current state of a computer system. If there is no prompt to make the output the operations 500 remain at step 502 until a prompt is received. Otherwise, the operations move to step 504.

In step 504, statements representing the current state of the computer system are obtained. For example, the statement obtaining module 125A in the computer system 104 obtains statements from the application programs 126, the repository, and the user interface input 110.

In step 506, focus values are assigned to elements within the statements. For example, the focus assigning module 125B in the computer system 104 assigns focus values to elements of the statements in the model 112. The focus values may represent the frequency with which an element occurs and the focus values may be based on an algorithm.

In step 508, a subset of the statements is identified using the focus values. For example, the subset identifying module 125C uses the focus values of the elements in the model 112 to identify the statements most relevant to the current state of the computer system 104.

In step 510, an output is made to a user, where the output is selected from several predefined outputs using the subset of the statements. For example, the computer system 104 outputs the state representation 124 and the goal recommendation 122 to the user 102. The output may be in written or audible form, to name only two examples.

In step 512, the operations 500 may terminate, such as by a terminate command input received from the user. If the operations 500 do not terminate they return to step 502.

Figure 6:
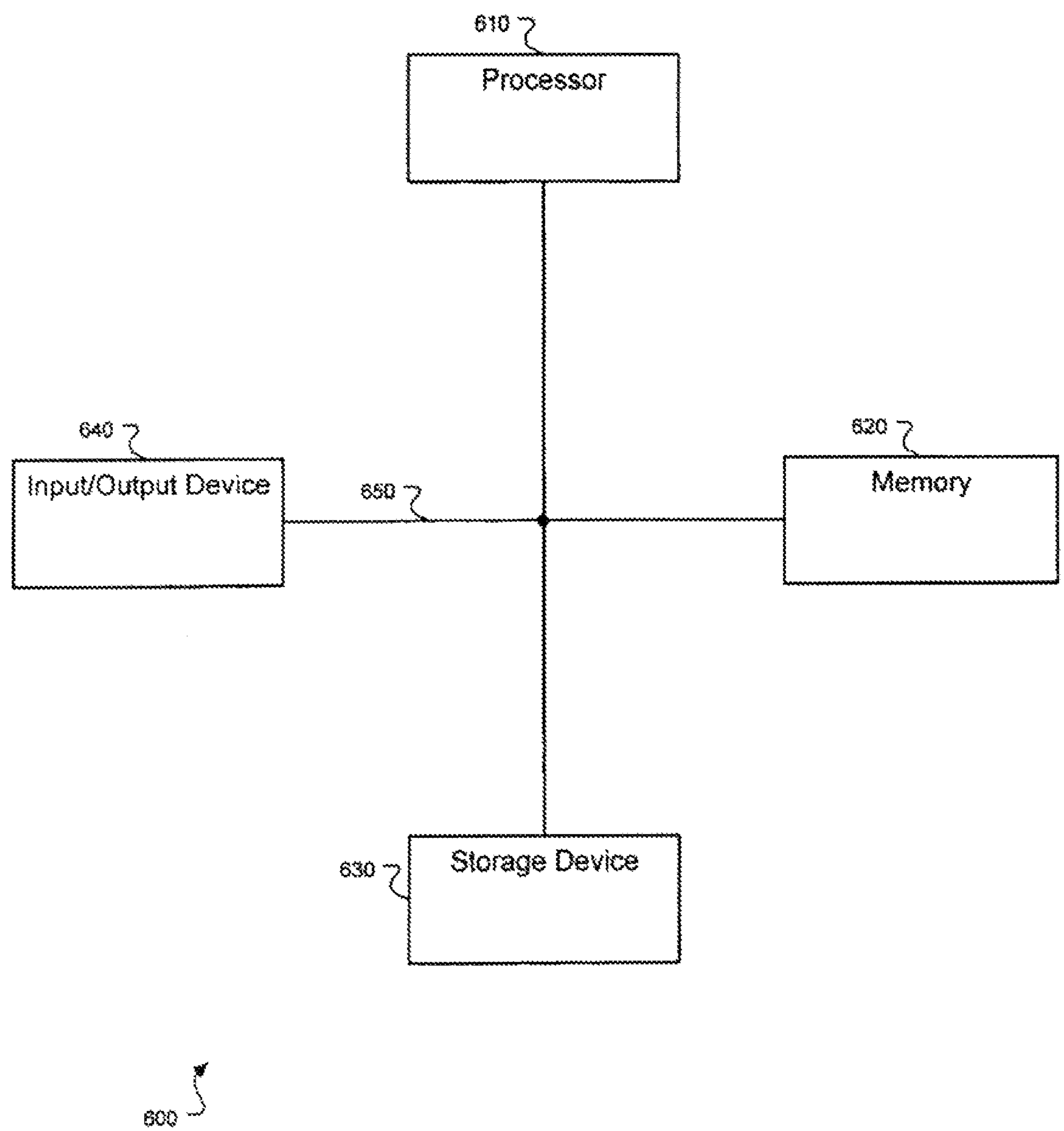
FIG. 6 is a block diagram of a general computer system.

FIG. 6 is a block diagram of a computer system 600 that can be used in the operations described above, according to one embodiment. For example, the system 600 may be included in the computer system 104.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one embodiment, the processor 610 is a single-threaded processor. In another embodiment, the processor 610 is a multi-threaded processor. The processor 610 is capable of processing instructions stored in the memory 620 or on the storage device 630 to display graphical information for a user interface on the input/output device 640.

The memory 620 stores information within the system 600. In one embodiment, the memory 620 is a computer-readable medium. In one embodiment, the memory 620 is a volatile memory unit. In another embodiment, the memory 620 is a non-volatile memory unit.

The storage device 630 is capable of providing mass storage for the system 600. In one embodiment, the storage device 630 is a computer-readable medium. In various different embodiments, the storage device 630 may be a floppy disk device, a hard disk device, an optical disk device, or a tape device.

The input/output device 640 provides input/output operations for the system 600. In one embodiment, the input/output device 640 includes a keyboard and/or pointing device. In one embodiment, the input/output device 640 includes a display unit for displaying graphical user interfaces. The input/output device 640 may be configured for audio input/output.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A non-transitory computer-program product tangibly embodied in a computer-readable storage device the computer-program product comprising instructions that when executed cause a processor to perform operations to manage statements relating to a computer system state, the operations comprising:

obtaining, in a computer system and from any of several sources, statements that relate to a current state of the computer system, each statement comprising elements, the elements being defined by a model that is maintained in the computer system;

assigning focus values to the elements of each statement, each focus value being stored in a variable associated with an element and indicating a relevance of the element to the current state of the computer system;

automatically identifying a subset of the statements based on the focus values, the subset of the statements comprising statements that are most relevant to the current state of the computer system;

analyzing the subset of the statements to identify, from among a plurality of predefined goals, one or more goals as being possible to accomplish based on the current state of the computer system;

providing a first output to a user, the first output comprising one or more recommendations associated with the one or more goals, the plurality of predefined goals being defined by the model and associated with respective actions that result in accomplishment of the plurality of predefined goals;

receiving an input from the user based on the first output provided to the user; and in response to receiving the input:

performing one or more actions that result in instantiation of one or more predefined goals associated with the first output, providing an explanation of the one or more actions, and updating the model based on the one or more actions.

2. The non-transitory computer-program product of claim 1, wherein the focus values correspond to which of the elements occur most frequently in the statements.

3. The non-transitory computer-program product of claim 2, wherein each focus value indicates total occurrences of a corresponding element in the statements.

4. The non-transitory computer-program product of claim 1, wherein the focus values are assigned using a relevancy algorithm.

5. The non-transitory computer-program product of claim 4, wherein the elements are of types including concepts, properties associated with the concepts, and relationships existing between the concepts, and wherein the relevancy algorithm attributes different weights to the types of elements.

6. The non-transitory computer-program product of claim 1, wherein the focus value for at least one of the elements is assigned based on a semantic of the element.

7. The non-transitory computer-program product of claim 1, wherein at least one of the several sources comprises an application program and wherein a first statement of the obtained statements corresponds to a state of the application program.

8. The non-transitory computer-program product of claim 1, wherein at least one of the several sources comprises an input device and wherein a first statement of the obtained statements corresponds to user input.

9. The non-transitory computer-program product of claim 1, wherein at least one of the several sources comprises a data repository and wherein a first statement of the obtained statements corresponds to stored information retrieved from the data repository.

10. The non-transitory computer-program product of claim 1, wherein the first output comprises a representation of the current state of the computer system to the user.

11. The non-transitory computer-program product of claim 1, wherein the elements are of types including concepts, properties associated with the concepts, and relationships existing between the concepts.

12. The non-transitory computer-program product of claim 11, wherein assigning the focus values further comprises determining whether at least one of the concepts is more relevant than an attribute associated therewith.

13. The non-transitory computer-program product of claim 11, wherein the focus values are assigned based on determining which of the concepts, properties and relationships occur most frequently in the statements.

14. The non-transitory computer-program product of claim 11, wherein the types of elements are defined in the model, and wherein assigning the focus values further comprises determining, from the model, whether two or more elements have a common type.

15. The non-transitory computer-program product of claim 1, wherein the statements comprise logical propositions that have been determined to be true in the current state of the computer system.

16. A non-transitory computer-program product tangibly embodied in a computer-readable storage device, the computer-program product comprising instructions that when executed cause a processor to perform operations to represent a computer system state to a user, the operations comprising:

obtaining, in a computer system and from any of several sources, statements that relate to a current state of the computer system, each statement including at least one element, the at least one element being defined by a model that is maintained in the computer system, wherein the model uses the statements to associate one or more predefined goals with at least one of several predefined actions that can be performed in the computer system to accomplish the associated predefined goal;

automatically determining a subset of the statements that is most relevant to the current state of the computer system, the subset being determined by analyzing which of the elements occur most frequently in the statements, the determining comprising storing values in respective variables associated with the elements;

analyzing the subset of the statements to identify, from among the one or more predefined goals, a subset of the one or more predefined goals as being possible to accomplish based on the current state of the computer system;

providing an output to a user that includes the subset of the statements and one or more recommendations associated with the subset of the one or more predefined goals associated with the subset of the statements, the one or more predefined goals being defined by the model, the output indicating to the user that the subset of the statements represents the current state of the computer system;

receiving an input from the user based on the output provided to the user; and in response to receiving the input:

performing one or more actions that result in instantiation of a predefined goal associated with the output, providing an explanation of the one or more actions, and updating the model based on the one or more actions.

17. A computer system comprising:

a programmable processor;

a computer-readable storage device coupled to the programmable processor and having instructions stored therein, which when executed by the programmable processor causes the programmable processor to generate:

a statement obtaining module that obtains, from any of several sources, statements that relate to a current state of a computer system, each statement comprising elements, the elements being defined by a model that is maintained in the computer system, a focus value assigning module that assigns focus values to the elements of each statement, each focus value being stored in a variable associated with an element and indicating a relevance of the element to the current state of the computer system, and a subset identifying module that automatically identifies a subset of the statements based on the focus values, the subset of the statements comprising statements that are most relevant to the current state of the computer system and that analyzes the subset of the statements to identify, from among a plurality of predefined goals, one or more goals as being possible to accomplish based on the current state of the computer system;

an output device that provides a first output to a user, the first output comprising one or more recommendations associated with the one or more goals, the plurality of predefined goals being defined by the model and associated with respective actions that result in accomplishment of the plurality of predefined goals; and an input device that receives an input from the user based on the first output provided to the user, wherein, in response to the input device receiving the input, the programmable processer to perform operations comprising:

performing one or more actions that result in instantiation of one or more predefined outputs associated with the first output, providing an explanation of the one or more actions, and updating the model based on the one or more actions.

18. The computer system of claim 17, wherein the elements are of types including concepts, properties associated with the concepts, and relationships existing between the concepts.

* * * * *